United States Patent [19]
Brandt et al.

[11] Patent Number: 6,081,834
[45] Date of Patent: Jun. 27, 2000

[54] NETWORK DATA PATH INTERFACE METHOD AND SYSTEM FOR ENHANCED DATA TRANSMISSION

[75] Inventors: Mark Steven Brandt, Laguna Beach, Calif.; Christopher John Harrer; Sarah Knerr Inforzato, both of Downingtown, Pa.; Michael Thomas Kain, Chester Springs, Pa.; Frances Ann Laukagalis, Philadelphia, Pa.; James Joseph Leigh, Wyncote, Pa.; Charles Austin Parker, Exton, Pa.

[73] Assignee: Unisys Corporation, Blue Bell, Pa.

[21] Appl. No.: 09/060,651

[22] Filed: Apr. 15, 1998

[51] Int. Cl.[7] .................................. G06F 15/167
[52] U.S. Cl. ..................... 709/213; 709/212; 709/234
[58] Field of Search ................... 709/234, 236, 709/212, 213, 214, 215, 216, 222, 227, 228, 237, 305; 710/53

[56] References Cited

U.S. PATENT DOCUMENTS

| | | |
|---|---|---|
| 5,577,212 | 11/1996 | Russ .......................................... 709/212 |
| 5,790,893 | 8/1999 | Polge et al. ................................ 710/53 |
| 5,812,775 | 9/1998 | Van Steres et al. ...................... 709/213 |
| 5,909,546 | 6/1999 | Osborne .................................... 709/212 |
| 5,909,553 | 6/1999 | Campbell et al. ....................... 709/236 |
| 5,920,703 | 7/1999 | Campbell et al. ....................... 709/236 |

*Primary Examiner*—Zarni Maung
*Assistant Examiner*—Yeshi Gebremeskel
*Attorney, Agent, or Firm*—Alfred W. Kozak; Mark T. Starr; Steven B. Samuels

[57] ABSTRACT

An improved high-speed data communications system is provided having software functions which permit a Network Data Path Interface to work in conjunction with a Distributed System Service application and a Network Provider application for enhancing data transfers to a Input/Output module and Network Processor. The improved Network Data Path Interface functions involve transmitting data outward to Channel Adapters via the use of shared buffers which can be re-used after utilization, and also receiving data by the sharing of buffers between a Distributed System Service application software unit, a Network Provider unit, and the Network Data Path Interface, enabling data to be received by the Network Provider for transferral to the Distributed System Service application unit.

13 Claims, 6 Drawing Sheets

NETWORK DATA PATH INTERFACE METHOD AND SYSTEM FOR ENHANCED DATA TRANSMISSION

CROSS REFERENCES TO RELATED APPLICATIONS

This application is related to co-pending application U.S. Ser. No. 060,650, filed Apr. 15, 1998, now U.S. Pat. No. 6,009,463 entitled "Method and System for Enhanced Data Communications Via Input Interface of Cooperative Service Interface" which is incorporated by reference, and U.S. Ser. No. 060,649, filed Apr. 15, 1998, now U.S. Pat. No. 6,021, 430 entitled "Output Interface Method and System for Enhanced Data Transfers Via Cooperative Service Interface", also incorporated herein by reference. Additionally, this application is related to co-pending applications U.S. Ser. Number 060,647, filed Apr. 15, 1998, now allowed, entitled "Multiple Interface High Speed Data Com System and Method" and U.S. Ser. No. 060,648 filed Apr. 15, 1998 entitled "Connection Library Interface System and Method for Process Inter-Communication Manager and Process Inter-Communication Element", each of which are also incorporated herein by reference.

FIELD OF THE INVENTION

The present disclosure relates to high-speed data communication systems having interfaces to provide performance improvements for Network Providers and their Users.

BACKGROUND OF THE INVENTION

In the data communication field involving computers and networking, there is a basic concept of the "dialog", which in computing circles, involves the exchange of human input and the immediate machine response that forms a "conversation" between an interactive computer and person using it. Another aspect of the "dialog" is the reference to the exchange of signals by computers communicating on a network. Dialogs can be used to carry data between different application processes, and can be used to carry data over computer networks. In computer networking, dialogs can be considered to provide data communication between application processes running on different systems or different hosts. Further, dialogs can carry data between application processes running on the same host.

There is a generally recognized OSI (Open System Interconnection) standard for worldwide message transfer communications that defines a framework for implementing transfer protocols in 7 layers. Control is passed from one layer to the next, starting at the layer called "the application layer" in one station, proceeding to the bottom layer, over the channel to the next station, and back up the layers of a hierarchy which is generally recognized as having 7 layers. Most of all communication networks use the 7-layer system. However, there are some non-OSI systems which incorporate two or three layers into one layer.

The layers involved for network Users are generally designated from the lowest layer to the highest layer, as follows:

1. The Physical Layer;
2. The Datalink Layer;
3. The Network Layer;
4. The Transport Layer;
5. The Session Layer;
6. The Presentation Layer; and
7. The Application Layer.

The Application Layer 7 (top layer) defines the language and syntax that programs use to communicate with other programs. It represents the purpose of communicating. For example, a program in a client workstation uses commands to request data from a program in a server. The common functions at this Application Layer level are that of opening, closing, reading and writing files, transferring files and e-mail, executing remote jobs, and obtaining directory information about network resources.

The Presentation Layer 6 acts to negotiate and manage the way the data is represented and encoded between different computers. For example, it provides a common denominator between ASCII and the EBCDIC machines, as well as between different floating point and binary formats. This layer is also used for encryption and decryption.

The Session Layer 5, coordinates communications in an orderly manner. It determines one-way or two-way communications, and manages the dialog between both parties, for example, making sure that the previous request has been fulfilled before the next request is sent. This Session Layer also marks significant parts of the transmitted data with checkpoints to allow for fast recovery in the event of a connection failure. Sometimes the services of this session layer are included in the Transport Layer 4.

The Transport Layer 4, ensures end to end validity and integrity. The lower Data Link Layer (Layer 2) is only responsible for delivering packets from one node to another). Thus, if a packet should get lost in a router somewhere in the enterprise internet, the Transport Layer will detect this situation. This Transport Layer 4 ensures that if a 12 MB file is sent, the full 12 MB will be received. OSI transport services sometimes will include layers 1 through 4, and are collectively responsible for delivering a complete message or file from a sending station to a receiving station without error.

The Network Layer 3 routes the messages to different networks. The node-to-node function of the Datalink Layer (Layer 2) is extended across the entire internetwork, because a routable protocol such as IP, IPX, SNA, etc., contains a "network address" in addition to a station address. If all the stations are contained within a single network segment, then the routing capability of this layer is not required.

The Datalink Layer 2 is responsible for node-to-node validity and integrity of the transmission. The transmitted bits are divided into frames, for example, an Ethernet, or Token Ring frame for Local Area Networks (LANs). Layers 1 and 2 are required for every type of communication operation.

The Physical Layer 1 is responsible for passing bits onto and receiving them from the connecting medium. This layer has no understanding of the meaning of the bits, but deals with the electrical and mechanical characteristics of the signals and the signaling methods. As an example, the Physical Layer 1 comprises the RTS (Request to Send) and the CTS (Clear to Send) signals in an RS-232 (a standard for serial transmission between computers and peripheral devices) environment, as well as TDM (Time Division Multiplexing) and FDM (Frequency Division Multiplexing) techniques for multiplexing data on a line.

It will be seen that present-day communication systems generally will have a high band-pass capability of data throughput for high speed network technologies which may occur at rates on the order of 100 MB per second, to 1 gigabit per second.

However, sometimes the problems of delays or latency may be high. Latency is generally considered to be the time interval between the time a transaction issues and the time the transaction is reported as being completed. In certain systems having a high latency, the round-trip time for two clients communicating with each other to complete a data request can be on the order of milliseconds.

The delays in communication due to "latency" will be seen to occur from conventional communication systems due partly to overhead in the communication layers, and generally is especially due to latency in the layers below the Transport Layer 4, i.e., Layers 3, 2 and 1. In high speed data communication systems, the Transport Layer 4 is still seen to impart substantial latency in communications.

The present Network Data Path Interface 30 (FIGS. 1, 2) method and system describes the functions and sequential operations for dialog messages between a Network Provider 20 and I/O 40. This enhances the speed of dialog exchanges and this improves communication system performance.

FIG. 3B shows a diagram of the major components of part of a datacom system illustrating the new (30) and the earlier (20b) interfaces for the Network Data Path. Referring to FIG. 3B, the top block is the DSS 10 (Distributed System Service). Connected to this, is a port file 14 and a synchronous port CB,16. Also connected to the DSS 10, is a cooperative System Interface (with a Connection Library) 12, which connects to the Network Provider 20. Also interfacing to the Network Provider 20 are the PIE's Connection Library Element (Process Intercommunication Elements) 18c and 18b of which 18c connects using a Connection Library (CL), and the other (18b) which connects using a Connection Block (CB).

A Distributed Application Supervisor (DAS 22). connects to the Provider 20, while also providing output to a path input control 23i (for prior path CB), and a Supervisor CB/CL control 23s. These last two blocks feed to the Network Processor Support module 35, which provides an output to the Logical I/O (LIO 34) and to the Direct Interface 32, and thence to I/O 40, whereby the Physical I/O 40 is a Simulation "Gatherer" to provide output to: the Integrated Communication Processor 42; or the Emulated Integrated Communication Processor 44; and/or to the Direct Integrated Communication Processor 46, which provide communication to Channel Adapters (CA) in a Network Interface Card (NIC) of Network Processor 50. The DAS 22 communicates with software in the Network Processor Environment 50.

The Network Processor Environment designated 50 of FIG. 3B is an architectural drawing showing the software contents of a Network Processor which provides the system with a Control 56, Path Subsystem (PSS) 54, and Protocol Stack Extension Logic (PSEL 52). This Network Processor environment includes processors 42, 44, 46.

NETWORK DATA PATH INTERFACE (30 FIG. 2):

Currently, Unisys Corporation's computer architecture supports two interfaces to the Network Providers—the standard user-visible interface through the port files, and—a system software synchronous interface called Sync_Ports. Sync_Port users can avoid copying incoming data in certain cases and can make decisions about where to copy it—because they are allowed to look at the data before copying.

The Sync_Port interface can also be used to eliminate processor switching in the input data path for certain applications. Often though, the strict rules about what could be processed in-line as part of notification of input—resulted in the process switch merely being moved into the Sync_Port user's code.

The BNA and the TCP/IP type Network Providers provide the Sync_Port interface. (which is used primarily by COMs_PSHs and the Unisys-supplied DSS's), with a performance boost.

The Cooperative Services Interface (12) of FIG. 2 and FIG. 5, provides an additional performance benefit over the Sync_Ports by allowing a Network Provider (20) and a DSS (10) to bypass the Port File code in the Master Control Program (MCP), by allowing it to share data and by relaxing the rules about what can be performed as part of an "input" notification.

The interface between the MCP's Port File code and the Network Providers (the PIE interface) was earlier implemented as an old-style Connection Block 18b, (CB), FIG. 3B, so that by changing this to a "Connection Library" (CL), 18c, this provided a performance advantage by eliminating the MCP overhead required to access the entry points exported via Connection Block (CB).

Because Connection Libraries (CL) can export data items in addition to procedures, this change also allows for the Port File Code and the Network Providers to share dialog-oriented locks. Such sharing allows the elaborate lock/deadlock avoidance code, previously employed, to be simplified greatly, thereby not only improving performance, but also closing numerous of the timing windows. Sharing locks in this way also obviates the need for several of the more complex interfaces in the priorly used interface.

The Unisys E-mode based portions of the Network Providers (20) were previously enabled to communicate with their ICP-based components via an interface provided by Network Processor Support, 35, FIG. 4. Network Processor Support 35 provided a complex path Connection Block (CB) interface which the Network Providers used to get the data they wished to send into an I/O capable buffer, and the Network Processor Support generated and parsed the QSP (Queue Service Provider) protocol, in order to "multiplex" the numerous dialogs (that the Network Providers had) over a single Physical Unit Queue.

In the new, improved architecture, "multiple queues" are now provided between the Unisys E-mode environment and a given Network Processor Environment, thus obviating the need for this previous multiplexing function and eliminating the de-multiplexing bottleneck on the Network Processor/Controller stack on the input.

Since the QSP (Queue Service Provider) protocol generation is very simple, that function is now moved into the Network Provider, 20. This re-distribution of function allows the Network Processor Support 35 (FIGS. 3B and 4) to transmit operations which are now accomplished by means of a Read/Write directly (Direct Interface 32) to the Physical I/O procedure 32 (FIG. 3B) providing transport to the Channel Adapter environment except in the case of the old Integrated Communication Processors (ICPs), where multiple queues still must be simulated in the Network Processor Support 35, FIGS. 3B and 4.

To avoid the necessity of copying data in order to assemble Network Provider-generated header data, and data from multiple-use buffers into one contiguous memory area, the ability to "Gather" data from multiple buffers on the output is added to the I/O processor in IOM 40. The Physical I/O 40 simulates "Gather" in cases where the I/O processor does not support it directly.

Additionally, a "Scatter" feature is provided so that a single incoming data message can be split across multiple buffers. This is used by the Network Provider(s) 20 to ease their memory management problems, they thus have a consolation code channel (in Network Provider 20, FIG. 3B) to cope with the cases where Scatter is not provided by the I/O processor.

As a result of the improvements to the Network Data Path Interface 30, FIG. 2, 3A there is a reduced need to copy data, throughput performance is enhanced, more transmissions can occur simultaneously by reducing routing overhead at destination end points, there is a greater capacity for multi-threading and the protocol stacks can more efficiently handle the use of buffers.

SUMMARY OF THE INVENTION

An improved Network Data Path Interface functionality is provided for enhanced data transfer and communication between a Network Provider and a Physical I/O Module and Channel Adapters which hold Network Interface Cards.

While earlier systems architecture required the use of a NP Processor Support Interface between a Network Provider and the I/O Module, the present system has effectively eliminated the requirement for the NP Support unit by enabling the input and output of message data to occur between an Input/Output Module and a Network Provider. This can be used to work in conjunction with a Distributed System Service application.

In the presently improved Network Data Path Interface, input messages can be transmitted from a Channel Adapter and Input/Output Module directly to the Network Provider and Distributed Systems Service application unit without the need for an intermediate Network Processor Support unit, thus eliminating much overhead and eliminating much latency in data transfers.

Thus, the present improved network and data path functions involve initiation of sending data from a Distributed System Service application out into a Channel Adapter by using buffers which can be shared and later re-used after message completion. Additionally, the interface can receive data directly from an I/O Module to a Network Provider's buffer, which can be transferred on to the Distributed System Service unit.

The I/O Module has multiple Input and Output queues for communication to and from the Network Provider via the Network Data Path Interface, which enables the Network Provider and the Distributed System Service unit to share buffers and transfer data by the use of buffer pool and lock pool images which utilize pointers to memory.

The result of enabling the omission of the priorly used Network Processor Support unit, and enabling direct transfers in communication through the Network Data Path Interface, between the Network Provider and the Input/Output Module, has enabled considerable performance improvements in data transfers to take place.

The management of buffers which are shared in the Network Provider and the Distributed System Service have their management responsibility moved to the Network Providers, and further, the earlier-used Connection Block interfaces have been replaced with Connection Library interfaces having more efficient capability for data transfers. The I/O Module or I/O subsystem is configured to support multiple units/pipes per Network Interface Card, which is permitted by the use of multiple input message queues and multiple output message queue, in addition to the provision of a Scatter function and a Gather function, which is supported during data transmission between environments.

As a result of eliminating a priorly used Network Processor Support unit, the present Network Processor (both input and output), permits a more efficient transfer interface to and from the Physical I/O unit.

The I/O Module (IOM) provides the "Gather" function on outputs and the "Scatter" function on inputs. Much operational overhead has been eliminated, buffer management is simplified and additionally, the improved interface can still be combined with prior Connection Block systems to provide capability of data transfer for earlier type systems using the older interfaces.

GLOSSARY LIST

Figure 1:
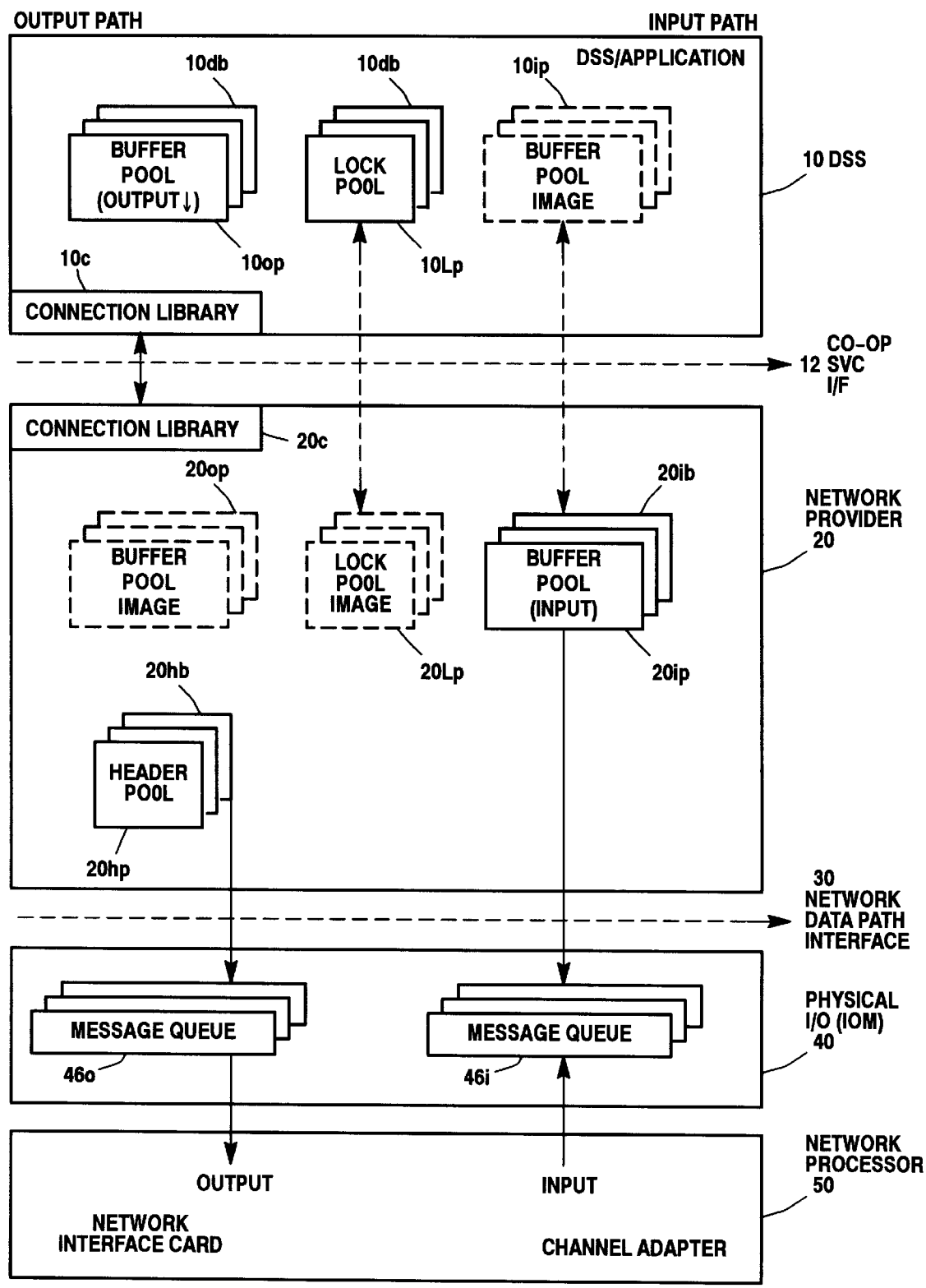
FIG. 1 is a drawing of the Network Data Path Interface using the Path-User's Connection Library between a Network Provider and a Channel Adapters via an I/O Module.

1. Distributed System Services (DSS): One of a collection of services provided on Unisys Host computers to support communication across multi-host networks. DSSs can be services such as file handling, station transfer, and mail transfer.

2. Cooperative Service Interface (Co-op): A systems level, connection-library based interface which allows the Distributed System Services (DSS) to communicate across the network with their peers. A system and method for using the services of a network provider to communicate with another instance of themselves somewhere else enabling communication to occur across a network.

3. Connection Library (CL): This is method of connecting two code files together at run time so that they can use each other's services. The Connection Library is a collection of one or more connection library elements and a library template. The "Library Template" is a structure that is built by the compiler and maintained by the Master Control Program (MCP) that determines what the procedures and functions and items are, that you are trying to import from the library. This involves a multiplicity of Connection Library elements. A Connection Library (or Server Library) permits access to another program's exported procedures and data. Connection Libraries allow one or more instances of two-way access, to the other program, and from the other program to the Library. Server Libraries allow only one instance of one-way access.

4. The Port File: A port file is an interface that allows programs to talk to their peers on the same system or other systems and which is based on the file interface. The "file interface" is used for disks, tapes, and card readers and all the traditional peripheral types and the port file provides adaptation of that interface for interprocess communication.

5. Sync Port Connection Block (CB): This was an older version of the cooperative interface which did not permit lock sharing or buffer sharing. Connection Block later evolved into more versatile operations as Connection Libraries and likewise the co-op interface was the evolution of improvements to the Sync Port Interface. The Sync Port Interface uses connection blocks while the more highly developed co-op interface uses Connection Libraries whereby the new co-op interface uses buffer sharing, lock sharing and fault management.

6. Provider: Provider is just a system or operation or a piece of software that provides a service. It could be looked at as a collection of software that provides a service.

7. Process Intercommunication Element-Connection Library (PIE-CL): This is the interface used by the port interface software to talk to the Network Provider.

8. Process Intercommunication Element-Connection Block (PIE-CB): This is an interface used by the port interface software to talk to the Network Provider using an earlier form of technology designated as the connection block technology. The old PIE-CB technology did not provide for lock sharing and buffer sharing but the new PIE-CL (Connection Library) does provide lock sharing and buffer sharing.

9. Scatter Consolation: This code is put into Network Processor Support software to make a machine which does not have hardware scatter capabilities yet appear to have scatter capabilities. Scatter is the operation of taking data coming in off an I/O bus and putting it into multiple different areas in the local memory, that is to say, it is scattered around.

10. Distributed Application Supervisor (DAS): This is a unit that has a function of determining what software should be loaded into the Channel Adapter, into the integrated communications processor (ICP) etc. It also is used to manage exceptions that it may notice, for example, such as software that is running in the ICP, which may detect some error and then the DAS must determine how to handle the error.

11. Network Support: A process which controls when Network Providers and DSSs are initiated and terminated and which routes network-related operator entered commands and their responses.

11a. NP Support: Network Processor Support. The software which allows Network Provider access to the Input and Output Queues, which contains Multiqueue Simulation software, and which multiplexes and demultiplexes data across the single input and output queues used in an earlier method of implementation of functions for a Network Data Path Interface.

12. Multiple Queue: There are I/O queues between the host memory and Channel Adapter card. The present system can define up to 16 queues in its I/O architecture which is an advantage over the earlier use of only two queues which involved one queue for input and one queue for output. Putting in multiple queues, gave each module a direct queue so that there was no need for multiplexing over one queue and then de-multiplexing on the other end. Thus, now each receiver would have its own queue.

12a. MQ simulation software is in NP Support which "simulates" multiple Queues on systems where the hardware does not support multiple queues.

13. Connection Block (CB): This is a method of connecting two code files together at run time so that they can use each other's services. It is similar to a file or a task or a job or a database or any of these types of abstract objects that are used in a given program. A CB is a less robust implementation of a Connection Library (CL).

14. Supervisor CB/CL: This involves the supervisor connection block/connection library and this is the interface object that the NP Support uses to talk to the distributed application supervisor (DAS).

15. Physical I/O: The Physical I/O system is part of the Master Control Program of the Unisys computer system hierarchy. This involves the software that talks to the hardware controllers. For example, it operates so as to indicate that it wants sector 35 off disk 22 and seeks 57 bytes from that location.

16. Logical I/O (LIO): Logical I/O is also part of the Master Control Program (MCP) and involves the file interface code. Whenever writing is done to a file or read from a file in a program, the system is actually calling the MCP module and called Logical I/O. The Port File interface code is also a subpart of logical I/O. It has its own module but provides Logical I/O functions for the Port Files. The regular Logical I/O operates with disks, tapes, printers, card punches and other peripherals.

17. Gather Simulation: This is provided by code in the physical I/O. Gather is an output operation whereby the I/O management module goes to the memory and gets certain messages or data from one location and then from another location and again from another location and puts them together in order to pass it on to a particular peripheral such as a tape.

Contrarily, the "scatter" operates the other direction, for example, the IOM will indicate that it has a stream of bits from a particular tape and it is then going to put some of this information here in one place, some of it here in another place and some of it in another or third place and that is the "scatter" operation.

18. Network Processor: Examples of these units are Channel Adapters, Integrated Communication Processor (ICP), Emulated Integrated Communication Processor (EICP), DICPs and Network Interface Cards. An integrated communication processor is often called a Data Link Processor (DLP) and, in particular, ICP is a Data Link Processor that has a Network Interface Card (NIC) associated with it. Channel Adapters also have Network Interface Cards.

18a. An emulated ICP is a portion of software that "pretends" to be the Network Interface Card on a system that operates on the basis of emulating the I/O mainframe system, such as was done in the Unisys Micro-A or Unisys A-7 and other systems. These systems do not supply any real I/O hardware but rather provide software that emulates the hardware. Thus an emulated ICP is a portion of software that pretends to be and operate as if it were ICP/DLP.

18b. Direct Integrated Communication Processor (DICP): The DICPs are also actually known as "Channel Adapters" and they are the units that replace the datalink processors (DLP) in the new I/O architecture. Thus a direct integrated communication processor is a Channel Adapter that does networking operations.

19. Interfaces—Cooperative System Services: They involve (i) input data path for dialogs associated with the Connection Library between the Network Provider and the DSS; (ii) an output data path for dialogs associated with the Connection Library between the DSS and the Network Provider.

20. Channel Adazters (CA): A Channel Adapter is a device that enables hardware using two different types of communication channels to communicate.

21. Path Sub-System (PSS): This is the peer of NP Support that runs in the integrated communication processor (ICP), the emulated integrated communication processor (EICP) or the direct integrated communication processor (DICP). This is the unit that the Network Processor Support talks its protocol to.

22. Protocol Stack Extension Logic (PSEL): This is part of the network provider involving its protocol stack that runs in the integrated communication processor (ICP).
23. COMS: This represents a communications management system. It is a Unisys message control system that supports processing for a network on the Unisys ClearPath NX server. It is described in the reference: Unisys A Series Communication Management System (CMS) operations guide, May 1989, Doc. 1154523.380.
24. Protocol Specific Handler (PSH): This is software which talks to items such as communication processors in order to get terminal access.
25. Network Selector Module (NSM): This is part of Ports Module in the Master Control Program (MCP). Its purpose is to take a User's File Open Request, a port file, and determine which Network Provider should be used. The Network Selector Module 9 (FIG. 3A) selects a Network Provider 20 to use for a specific instance of the port interface.
26. Library Template: A structure built by the compiler and maintained by the MCP to determine the procedures, functions and items to be imported from the Connection Library.
27. Pipe A pipe is a path (input or output) between a Network Provider and the Channel Adapter/Integrated Communications Processor (CA/ICP), which is associated with a specific end point. A pipe can be associated with a connection end point on the ICP/CA for output or to a specific entity end point (upper layer protocol) in the Network Provider for input.

The use of pipe is defined by the Network Provider and the CA/ICP and the QSP IDs which are used to uniquely identify each pipe. QSP refers to the Queue Service Provider. A pipe may or may not map directly to a specific queue.
28. Queue: A queue number identifies a specific I/O queue relative to a particular ICP/CA (Integrated Communications Processor/Channel Adapter). Each queue is an independent list of I/O requests. Within each queue, requests are ordered. There is no ordering of requests in different queues. The ICP/CA is given one request at a time (the one at the head of the list) from each queue.
29. Queue Service Provider (OSP): This is a unit that provides the queue service to a requester. It is basically a protocol that puts everything into one queue and takes it all back off. That protocol is called QSP protocol (Queue Service Provider).
30. Pipe ID: A field in the QSP protocol which identifies the logical pipe. It is used for multi-queue simulation.
31. Dialog: A dialog or dialogs are operations which carry data between different applications processes. Dialogs can be logically set to carry data over a computer network. In a computer network, dialogs provide data communication between application processes running on different end systems or hosts. Dialogs can also carry data between application processes running on the same host. Dialogs are implemented by the use of the various functional layers for example, Application, Presentation Session, Transport, Network, Link and Physical, which are used in data communication networks to provide various services and also reliability. Each layer will have its own particular protocol and range of fundamental instructions in order to provide services. Dialog operations and particular features may sometime include the scatter support and gather support.
32. Connection Library Element: This is one element of the Connection Library which may involve multiple elements. It provides implementation of an interface, much like the FILE object in a program not the actual file on disk, but rather it is an OBJECT in the program that allows access to an actual file on the disk.
33. Network Provider: A software operation which implements the Presentation, Session, Transport and Network Layer portions of the relevant protocol stack in the MCP environment.
34. Lock: An object which can be used to ensure that only one entity is accessing a shared resource or object at any given time.
35. PIE-CL: Processor Inter-communication Element for the Connection Library.
36. PIE-CB: Processor Inter-communication Element for the Connection Block.
37. PIM-CL: Processor Inter-communication Manager for Connection Library.
38. PIM-CB: Processor Inter-communication Manager for Connection Block.
39. Open Sequence: A protocol dependent exchange of messages which establishes a dialog.
40. Interface Name: This is a library attribute defined in Unisys Corporation's published document 8600 0494 entitled "ClearPath HMP NX and A Series Task Management Programming Guide".
41. E-Mode: The operator set for Unisys Corporation's A-Series computers.
42. E-Mode Environment: The operating environment of a machine which supports E-Mode and runs the Master Control Program (MCP).
43. EIO File Object: A file system-based mechanism used to associate an instance of Network Processor Support (FIG. 3B, element 35) with a Network Processor (Glossary Item 18).
44. Link Library: A function call of the MCP (Master Control Program) which creates a binding link between two Connection Libraries (CL's).
45. Data Path CL (30, FIG. 3B): The Connection Library object used by the Network Provider to talk to Network Processor Support and Physical I/O or vice-versa. It is shown as element 30 in FIG. 3B.

GENERAL OVERVIEW

The presently described Network Data Path Interface 30 subsists within a network of peer computer systems which operate in communication with each other.

Figure 3A:
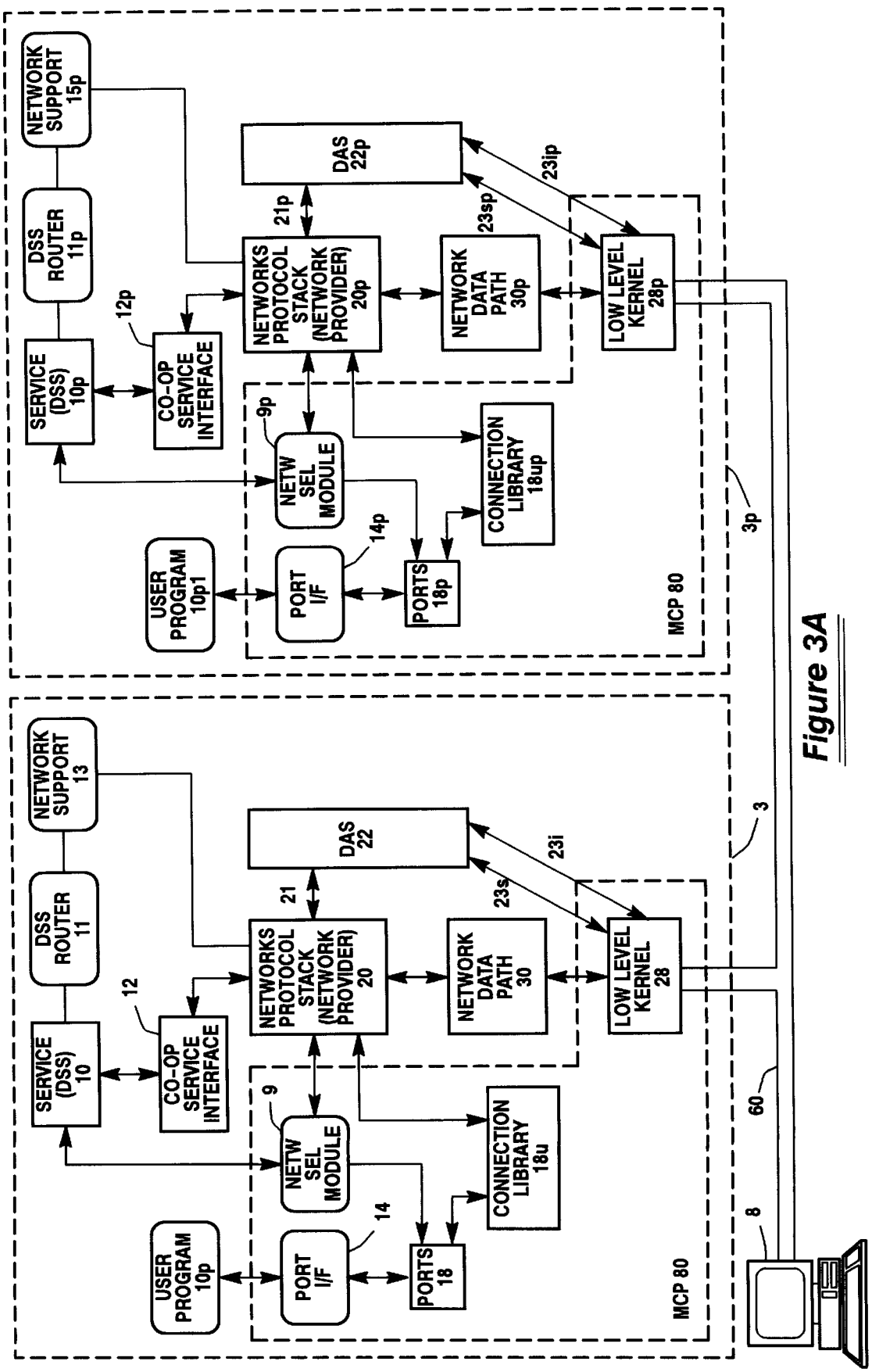
FIG. 3A is a multiple peer network drawing showing the placement of the Cooperative Service Interface in each of two peer systems on a computer network.

FIG. 3A is an overview of a specialized high speed datacom system where a User terminal 8 utilizes the interconnecting bus 60 to connect to a first computer system 3 and a second computer system 3p which is basically a duplicate copy of the first network.

There are different categories of elements involved in FIG. 3A which can be summarized as follows:

(a) Network Providers (20, 20p) designated NP, which may involve the TCP/IP protocol, or other protocols.

(b) The Users of the Network Providers, the DSSs 10s 10p, (Distributed System Services), COMS (Communication Management System), and PSHs (Protocol Specific Handlers), which interface terminal-related protocols to the COMS program defined in the Glossary.

(c) Master Control Program 80 (MCP), which is the main operating system of which one portion includes the Network Selector 9.

(d) The Network Support items, such as the interface to the Network Selector, the DSS Router Interface, and the network software installation and configuration.

Referring to FIG. 3A, it will be seen that each computer system 3 and 3p is composed of correspondingly similar modules which can be described below for example, in connection with the network 3, of FIG. 3A.

The User terminal 8 will communicate with the low-level kernel 28 of computer system 3 which is in communication with the network data path 30 which communicates with the network's protocol stack 20 (Network Provider). The network's protocol stack 20 has a communication line 21 to the DAS 22, (Distributed Application Supervisor) which has two communication lines to the low-level kernel 28, these communication lines being shown as 23s and 23i. The network's protocol stack 20 communicates to a Connection Library 18u which connects to the Ports module 18. The Ports module 18 is in communication with the Port Interface 14 which is in communication with the User program 10p.

FIG. 3A involves a service networking operation, where for example, there are two peer computer systems 3 and 3p. One computer system such as computer system 3 will have a User terminal 8 which connects to it, and also connects to the second computer system 3p.

For example, the User terminal 8 may have a payroll application program, while the databases for this may reside in computer system 3 or computer system 3p.

The low-level kernel 28 and 28p are software interfaces which connect to the computer networks. In the User terminal 8, there could be an equivalent interface called the Network Interface Card.

Each of the computers contain multiple protocol engines, each of which supports a protocol, such as TCP/IP, UDP (User Datagram Protocol) and other internet protocols.

The Ports 18 and 18p are file interface-based software which allows programs to send messages to other programs across the network, so that programs can talk to other programs. The software in the Port Interfaces 14 and 14p, are basically placed in the MCP 80 (Master Control Program), and they operate as system software within the MCP 80.

The operations of FIG. 3A function such that the computer system 3 could become a sender and send a message to computer system 3p which could become a receiver, after which the computer system 3p becomes a sender and sends back an answer to computer system 3 as the receiver.

In FIG. 3A, each of the computer systems 3 and 3p will have a DSS Router 11 and Network Support Module 13. Further, a Port 18 associated with port interface 14, is placed in communication with a Network Provider 20 by the Network Selector Module 9.

It should be understood that the computer system 3 and the system 3p may be a long distance apart, such as in different cities or different countries.

The Port Interfaces 14 and 14p are described in the Unisys I/O Subsystem Programming Guide, Document number 86000056, published June 1995.

Figure 2:
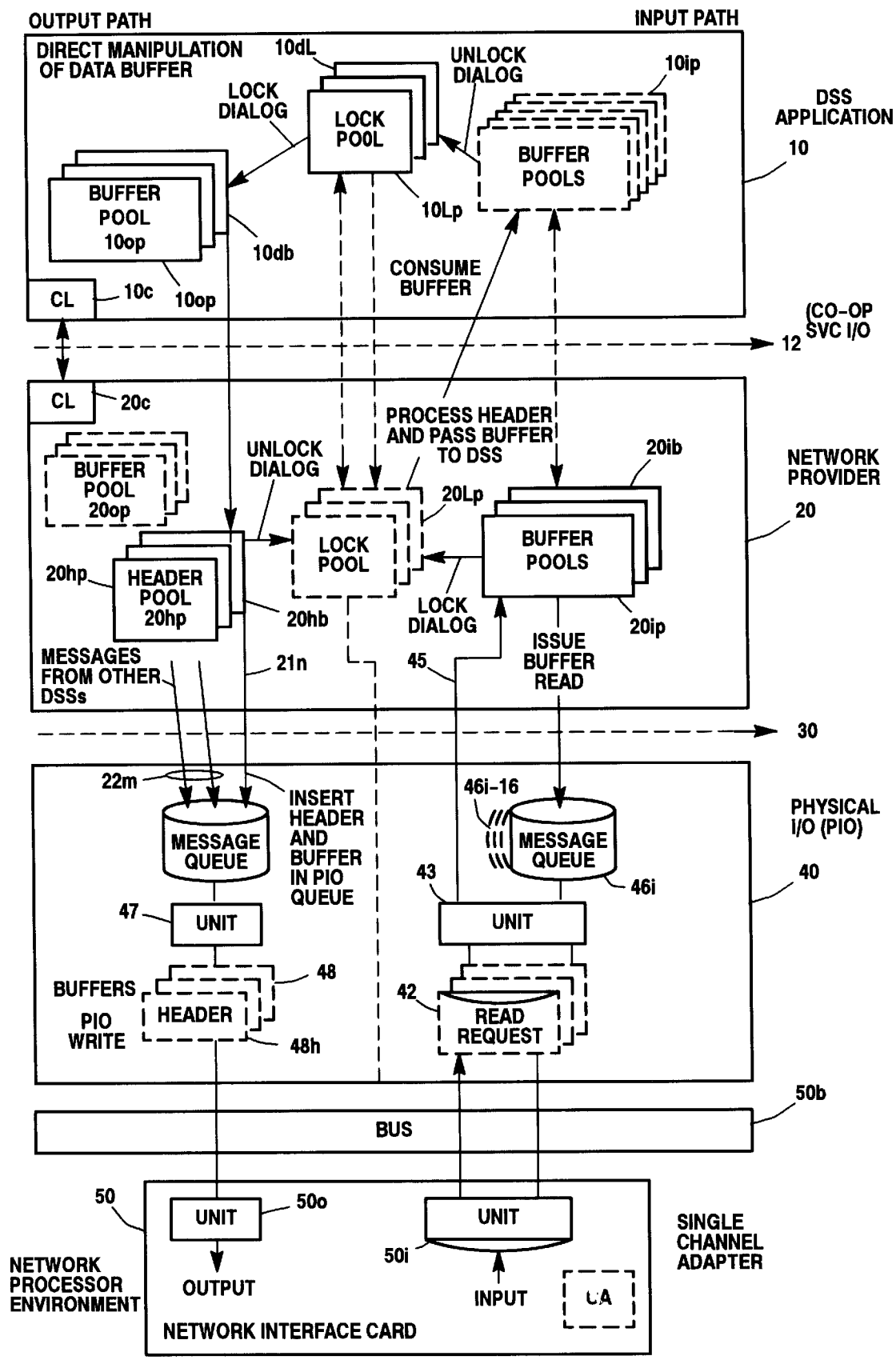
FIG. 2 is a networking software architectural diagram used to illustrate elements and functions of a Cooperative Service Interface which receives Inputs and sends Outputs via a Network Data Path.
Figure 5:
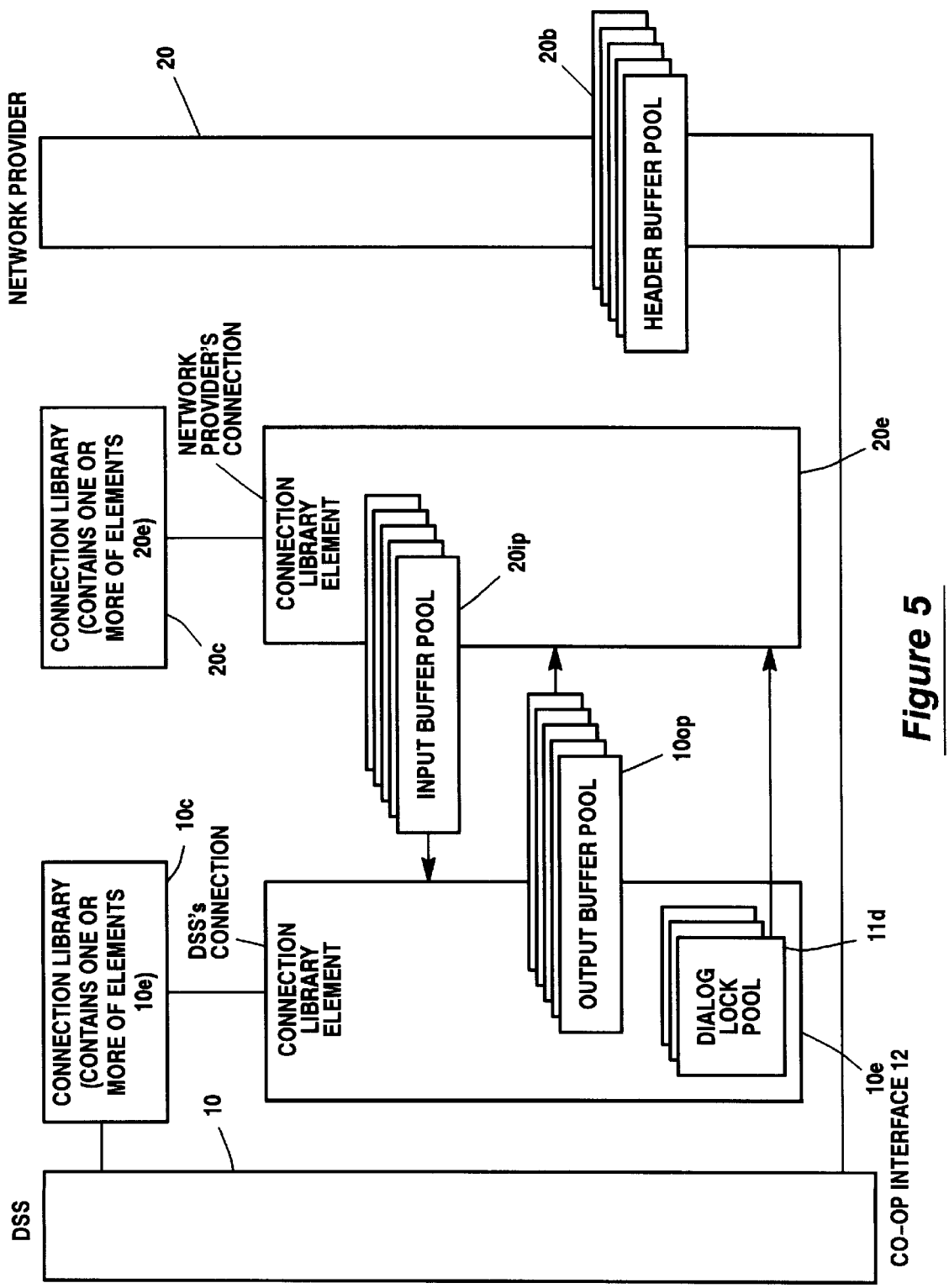
FIG. 5 is a diagram illustrating how buffers and locks are shared between a Distributed System Service (DSS) and a Network Provider using a Connection Library facility of a Cooperative Service Interface.

As seen in FIG. 5 and FIG. 2, there is a Cooperative Service Interface method and system 12 which involves the transfer of dialog messages between a Distributed System Service (DSS) 10 and a Network Provider 20.

The DSS 10 can generally be any software program, but typically is an implementation of the "Application Layer" (Layer 7) which defines the language and syntax that a program uses to communicate with another program as part of the OSI (Open Systems Interconnection Standards). The Application Layer may involve services such as FTP (File Transfer Protocol), FTAM (File Transfer and Management) and messaging protocols such as mail, Telnet and other terminal access protocols.

The Network Provider 20 of FIGS. 2, 3A and 5, is also often referred to as Network Transport Protocol Implementation such that the Network Provider (NP) is an implementation of the hierarchical layers (6,5,4,3) "below" the Application Layer 7. The Network Provider thus implements the protocol stack for the lower layers such as TCP/IP, UDP/IP, BNA or the OSI Presentation layer down.

The Network Provider 20 encompasses the Presentation (Layer 6), the Session (Layer 5), and the Transport (Layer 4), and where the Datalink (Layer 2) is implemented in a Network Processor in the Network Interface Card 50 of FIG. 2. The Network (Layer 3) is typically implemented in the Network Provider, but also may be implemented in the Network Processor.

The Cooperative Service Interface 12 and its method of operation will be seen in the broad view of FIG. 3A, as the interface between the Service Module 10s, also called "DSS" (Distributed System Service), and the Network Provider 20, also called the "Network Protocol Stack". Thus, the Cooperative Service Interface 12, is the programmed interface of interconnecting operational activities between the DSS 10 and the Network Provider 20, of FIG. 6.

A brief overview of the Cooperative Service Interface 12 is shown in FIGS. 1, 2 and 5 where the Distributed System Service 10 is interrelated to the Network Provider 20 through use of a set of buffer pools, and a lock pool.

Thus, in FIG. 5, the DSS 10 has a Connection-Library Element 10e, which has a dialog lock pool 11d, a reference to which is transmitted to the Network Providers Connection-Library Element module 20e. A Connection Library $10_c$ contains the DSS's Connection Elements 10e.

Further, the Network Provider 20 has a header buffer pool 20b which is associated with the Network Provider's Connection Library $20_c$. The Connection-Library Element $20_c$ has an input buffer pool $20_{ip}$, whereby data is made available (shared) to the DSS Connection-Library Element 10e. Likewise, the DSS Connection-Library Element 10e has an output buffer pool $10_{op}$, whereby data is made available (shared) to the Network Provider's Connection-Library Element 20e. The Connection Library 20c contains the Network Provider's Connection Elements 20e.

The basic functional design of the High Speed Data Com (HSDC) Network Data Path Interface 30 is seen in FIG. 1 with use of the Connection Libraries CL 10c, 20c, of FIG. 2 which use the elements 10e and 20e of FIG. 5.

The general purpose is to implement performance improvements for Network Providers.

The improved Network Data Path Interface 30 (FIG. 3B) consists of the interface functions between the Network Provider 20, and Physical I/O 40; Network Provider 20 and Path Subsystem 50; Physical I/O 40 and Controller 56; Network Provider 20 and Protocol Specific Extension Logic (PSEL), 52 (FIG. 3B).

Figure 3B:
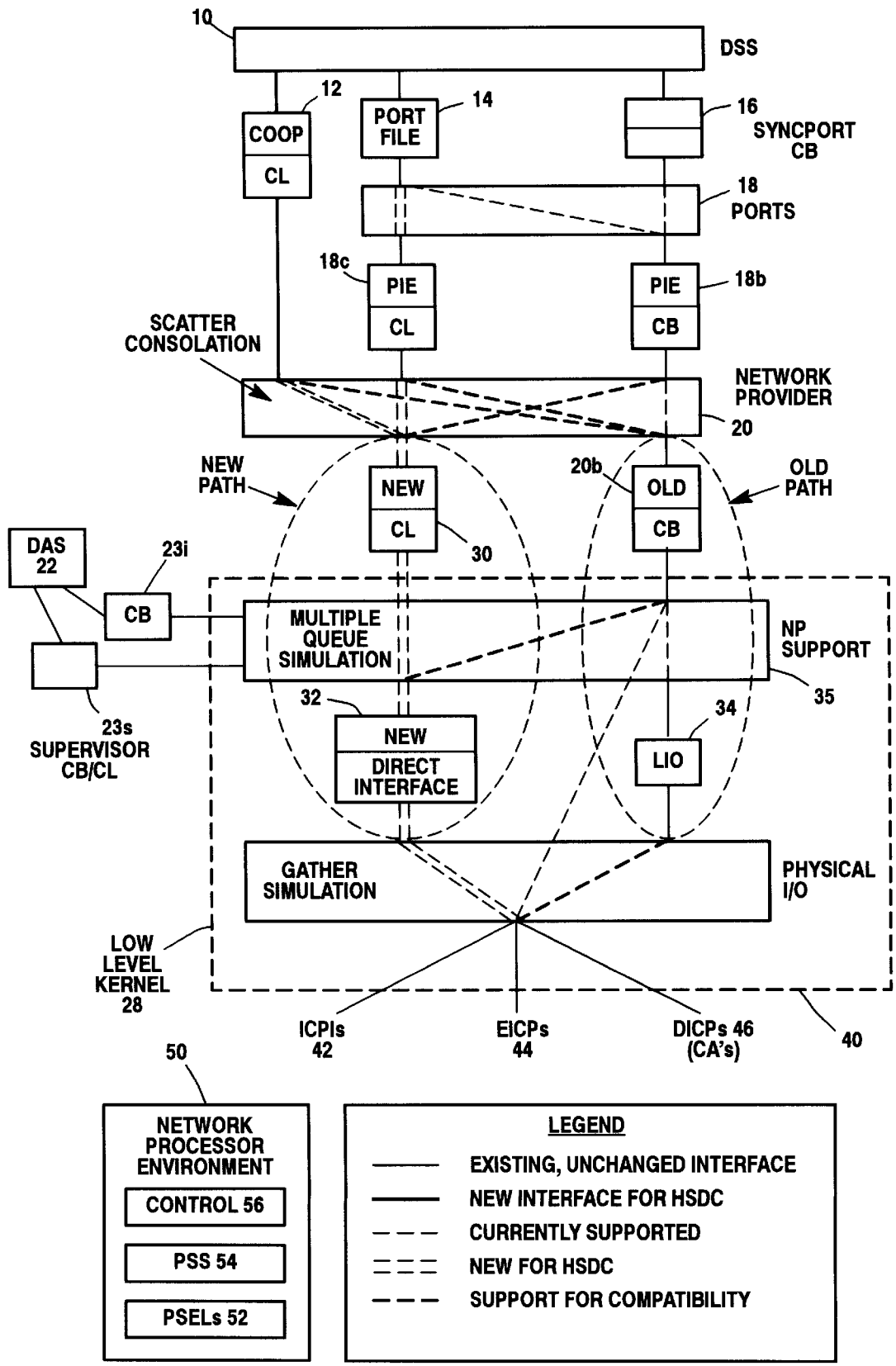
FIG. 3B is a drawing of a data communication system showing the new Network Data Path Interface also working in a system supporting an earlier Connection Block Interface.

The Interface implementation per FIG. 3B includes:
(a1) moving buffer management responsibility from the prior Network Processor Support 35 over to the Network Provider 20, or to the DSS 10 (Distributed System Service). In effect, the need for the Network Processor Support 35 of FIG. 3B is eliminated.
(a2) replacing the former Connection Block interfaces with Connection Library interfaces.
(a3) providing support of multiple queues (unit/pipes).
(a4) providing support of Multi-Area functionality in Physical I/O.

FIG. 1 is a generalized diagrammatic sketch showing the relationship of the Network Data Path Interface function 30 to the DSS 10, the Network Provider 20 and the Cooperative Service Interface 12 which cooperate to enable Input data transfers and Output data transfers from and to the message queues of the I/O 40 and Channel Adapters which hold Network Interface Cards (NIC). The detailed operational functions are later described in connection with FIG. 2 which involves a more detailed description of the improved high speed data-com operations.

AREA INVOLVEMENT: The implementation of this system involves the following entities:

(i) Network Processor Support 35 (now eliminated, except for compatibility, or when added for use of earlier systems);

(ii) Network Providers 20 (TCP/IP, BNA, SNA).

(iii) DSS (Distributed System Services), 10.

(iv) Network Processor (Controller and Path Subsystem), 50.

(v) MCP (Master Control Program) (FIG. 3A).

HARDWARE COMPATIBILITY: This system will provide for a relationship between the Multi-Area I/O feature, plus the Unisys Corporation A-Series physical I/O model, in addition to providing relationships between multiple pipes and the Integrated Communication Processors with Network Processors.

COMPATIBLE SOFTWARE: The High Speed Data Com (HSDC) version of the Network Processor Support 35 runs on earlier versions of Master Control Programs (MCP). The QSP (Level 2) is only supported on E-mode level Gamma and Delta systems running the MCP containing the High Speed Data Com changes provided herein. Network Providers and the Channel Adapter (CA) firmware are required to be at the same level. QSP refers to Queue Service Provider.

SPECIAL FEATURES
NETWORK DATA PATH INTERFACE (30, FIG. 1):

1. New faster lower level interfaces between Network Providers and Physical I/O. This puts some added burdens on the Network Provider, the least of which requires that I/O length be appropriate for the device. FDDI Channel Adapter's (CA) require I/O lengths to be "even multiples" of 4 bytes.

2. Certain IOMs are changed to support the Multi-Area I/O.

3. A rudimentary memory management support for the Multi-Area capable buffers are provided.

4. Channel Adapters can support 16 Physical I/O queues instead of the prior two queues.

FUNCTIONAL VIEW: The new Network Data Path Interface shows a lower level interface than was provided in prior implementations. In the new Network Data Path Interface, Network Providers 20 will deal directly with the Physical I/O 40 bypassing the Network Processor Support 35 and its associated overhead. The Network Processor Support 35 can optionally remain only to handle device ownership issues, to assist in initializing IOCBs (Input/Output Control Blocks), buffers and event references, and also to provide support for providers which still use the earlier-type interfaces. The prior existing limit of two queues (one Input, one Output) between the E-mode environment and the Channel Adapter (CA) environment has now been expanded to 16 queues (15 for Input, 1 for Output), and these queues are statically assigned to various Network Providers. This eliminates a layer of routing in the Data Path and allows for more than one worker stack to process Input from a given device as required.

A "Gather Capability" is now added to the IOMs 40 (Input/Output Modules) to allow sending of data contained in up to three separate 3-mode arrays without need for copying. This is particularly helpful for networking, which often deals with several layers of header and control information, in addition to the user data or to the DSS supplied data.

DESCRIPTION OF THE PREFERRED EMBODIMENT

The Network Data Path Interface 30 (FIGS. 1, 2, 3A, 3B) is one of several system software interfaces used in the present high speed data con system. These interfaces are indicated below.

System Software Interfaces (i) The Network Processor and Network Processor Support (NPS);

(ii) The Network Provider and Physical I/O;

(iii) Physical I/O and Path Subsystem;

(iv) Network Processor Support and Connection Services;

(v) Connection Services and Network Provider.

The presently described Network Data Path Interface 30 provides operations of the interface between the Network Provider 20 and Physical I/O 40.

PURPOSE: The purpose of this interface is to manage the initialization and termination of input/output requests related to Network Data Paths.

FUNCTIONS: On the "Input Data Path," the Network Provider 20 is responsible for managing input buffer pools and initializing the input pipes. Network Processor Support 35 (when used) is responsible for insuring that the input buffers and the associated events are attached and properly marked as "Read" buffers.

Once the input buffers have been initialized, the Network Provider 20 waits for an input indication from the I/O 40. Network Provider 20 is also responsible for maintaining worker stacks to process input indications from the Physical I/O 40. It is assumed that at least one worker stack per input queue is required. Since the Network Provider 20 may process input on the worker stack, more than one worker stack per input queue may be required.

On the "Output Data Path", the Network Provider 20 is responsible for creating all output queues and initializing the output buffers. The output buffers are initialized via a "Call" to the Network Processor Support 35. The output is then sent directly to the Physical I/O 40. Network Processor Support is used for initialization of the arrays and is only active during initiation of requests when multi-queue simulation is being used.

The basic architecture of the Network Data Path Interface 30 is shown in FIG. 1 where the Network Provider (20) Protocol Stack is seen to have a buffer pool 20*ip* whereby one selected buffer such as 20*ib* is selected for a dialog message. The Network Provider 20 is seen to utilize a Connection Library Element of a Path User Connection Library (CL) to maintain communication with the Physical I/O 40 (FIG. 2).

IMPROVEMENTS: In order to provide additional performance improvements, this Network Processor Support Interface 35 will make use of the new Connection Library (CL) mechanism, 20*m* 30 seen in FIG. 3B.

The Network Processor Support 35, when utilized in the system, can also continue to support the CB (Connection Block) Network Provider Interface for Network Providers which do not use the new Connection Library (CL) Interface as indicated in FIG. 3B. Also, Network Providers 20 can support the prior type of Connection Block Interface 20*b* in case the system version of the Network Processor Support does not support the new interface.

INITIALIZATION AND TERMINATION: The Connection Library (10c, 20c, FIG. 1, 2, and 18u, FIG. 3A, 3O, FIG. 3B) (CL) between any given Network Provider 20 and Network Processor Support 35 contains one Connection Library Element (CLE) per device. All pipes between the given Network Provider and a given device will use the same Connection Library Element (CLE) FIG. 5. The pipe "id" is passed on to the Network Processor Support via the Initialize_Pipe instruction.

The CLE (FIG. 5) is connected to Network Processor Support via the INTERFACENAME attribute in the Link Library. This INTERFACENAME is based on the ICP/CA unit number. For example, INTERFACENAME="NP_←UNITNUMBER→.".

NETWORK PROCESSOR SUPPORT APPROVAL PROCEDURE: The Network Processor Support 35 initializes all procedure references based on whether or not the ICP/CA supports multiple pipes. This approval procedure is only invoked during initiation of the CLE (Connection Library Element).

NETWORK PROVIDER CHANGE PROCEDURE: The Network Provider's Change Procedure is used to insure proper termination when the NP Support goes away. The Network Provider is responsible for cleaning all of the "Area 1" buffers attached to the device being terminated. These buffers must then be marked as "free" for use by other devices but cannot actually be used until another Attach_Buffers_and_Events operation is done to associate them with a new device. "Area 1" buffers represent the first buffer in a multi-area I/O.

NETWORK PROCESSOR SUPPORT CHANGE PROCEDURE: The Network Processor Support change procedure is used to insure proper termination when the Network Provider 20 goes away. When the change procedure is invoked with a state of "delinked", the Network Processor Support 35 informs the Path Subsystem 50 with the ENDP commands on the output queue. This informs the Path Subsystem that there are no more GETs outstanding for the pipes initialized via the Connection Library (CL). The Network Provider 20 will then wait for outstanding I/Os to complete. All outstanding GETs will be completed by returning a "dummy message" as handled in the Path Subsystem-Network Processor Support Interface.

DELINK LIBRARY: The Network Provider 20 performs an explicit Delink Library to initiate termination of the CLE. Both the Network Provider and the Network Processor Support 35 are informed of a delink via appropriate change procedures. The Network Provider terminates the Connection Library (CL) when the connection is cleared.

INTERFACE FUNCTION: The Connection Library (CL) elements (30m, FIG. 3B) between the Network Provider and the Network Processor Support provides: (i) initialization of the input pipe; (ii) initialization for the Input/Output data buffers to be used for both Physical I/O Reads and Writes, for both the Gather and the Non-Gather Systems; (iii) termination of data buffers; (iv) I/O error handling and simulation of multiple pipes for systems that do not support them.

NETWORK PROCESSOR SUPPORT INITIALIZE PIPE: This is an earlier procedure (in FIG. 4) which is exported from the Network Processor Support Connection Library 30 (FIG. 3B) and is called by the Network Provider 20. This procedure is called by the Network Provider 20, once the Library Link has completed successfully. It passes the pipe "id" so that the Network Processor Support 35 can send the PIPE command to the Path Subsystem 54 on the Network Processor 50. The pipe "ids" owned by each Network Provider are static (per DAS 22, FIG. 3B) and are unique to the entire system, that is, they cannot be shared across Providers.

There are a number of significant features which are provided by the systems Cooperative Service Interface 12 (FIGS. 1, 2, 3A). These features include the elimination (Seen in FIG. 3A) of a Port I/F (logical I/O 14) and ports 18 which would normally be required for the DSS's data path. The Network Selector Module 9 need not be used when the Cooperative System Service interface 12 is used. The buffer sharing between the Network Provider 20 and the DSS 10 will be seen to (i) eliminate data copies, and (ii) eliminate call-back procedures. The arrangement for lock-sharing between the Network Provider 20 and the DSS 10 will be seen to (a) simplify the locking procedures, and (b) eliminate the lock-related timing holes. Further, the interface between the DSS 10 and the Network Selector Module 9 (FIG. 3A) also work for enhancement of supporting the Cooperative Interface. The Cooperative Service Interface 12 presents certain advantages over its predecessors which previously involved a synchronized port interface which used connection blocks (CBs); and the new Cooperative Service Interface now uses a CL-oriented interface, providing a CL-oriented (Connection Library) interface which allows the elimination of the logical I/O port 14, but also now allows buffer sharing.

The Cooperative Service Interface 12 has certain key features of enhancement which involve (i) the locking strategy whereby dialog locks will be shared between the DSS 10 and a Network Provider 20. Further, (ii) the use of buffer-sharing whereby ownership of the Network Provider input buffers is logically transferred to the DSS 10 when the DSS 10 chooses to retain a buffer delivered to the DSS 10. The ownership of the DSS 10's output buffers is logically transferred to the Network Provider 20 for transmission when the output is requested. As a result, much data-copying is eliminated.

The ownership of buffers shared in this way is later returned to their original owner when the borrower is finished with them.

Referring to FIG. 2, there is seen a drawing of the utilization of the Cooperative Services Interface 12 by means of showing two main channels of the data flow, that is to say, the output path, and the other path being the input path. Here in FIG. 2, there is seen the DSS 10 having an outgoing buffer pool $10_{op}$, a lock pool $10_{Lp}$, and an image of the input buffer pools, $10_{ip}$, which consist of pointers to the actual pool, $20_{ip}$ in the Network Provider 20.

In communication with the DSS 10, is the Network Provider 20, which is seen to have an input buffer pool $20_{ip}$, and where there occurs an image $20_{ip}$ of buffer pool $10_{ip}$ (involving pointers of buffer pool $20_{ip}$ from the DSS's perspective). Additionally, the Network Provider 20 has an image lock pool $20_{Lp}$ which receives pointers from the actual lock pools $10_{Lp}$, and via a Connection Library element, 10c, from the lock pool $10_{Lp}$.

The Network Provider 20 will be seen to have a set of buffer pool image pointers designated $20_{op}$, which are received from the buffer pool $10_{op}$. Likewise, an Issue Buffer Send Command is sent to the header pool $20_{hp}$ to build the protocol header in $20_{hp}$.

In the Network Provider 20, there are other paths for carrying messages from other DSSs as seen on bus 22m, and further, there is a connection 21n for inserting headers and buffer information in a PIO (Physical I/O) queue of the Physical I/O 40.

The Physical I/O 40 is a function of the Master Control Program 80, FIG. 3A (MCP), where it is seen that "outgoing" messages are placed on the message queue $46_o$, then transferred to the I/O storage unit 47 in order to build a header 48h, and the Write buffers 48, which are sent on bus 50b to the output unit 50o. The message-queues $46_o$ is a single queue 46i is actually multiple in number and constitutes 16 queues designated via dotted lines as $46_i$-16.

Similarly, the Physical I/O 40 will be seen to have an "input" Read image block 42, which is connected to the unit 43 in order to store messages onto the message queue $46_i$ and also to send information (message Complete) on bus 45 to the buffer pools $20_{ip}$, and specifically for example, to a selected buffer $20_{ib}$.

Data flows are shared according to the lines headed by arrows shown in FIG. 2. The buffer pool $10_{op}$ in FIG. 2, is the output buffer pool which is owned by the DSS 10 (shown in solid lines), and is exported to the Network Provider 20 where its imported image of pointers is shown as buffer pool (pointers) $20_{op}$.

Similarly, there is shown the owners and imported images of other shared data items, such as the dialog lock pool $10_{Lp}$ owned by the DSS 10, which is exported to the Network Provider 20. The "input buffer" pool $20_{ip}$ owned by the Network Provider 20 is exported to the DSS 10, where it is consumed by the DSS which writes it to disk if it is transferring a file. The DSS 10 also can put the information in a mail box if it is receiving mail.

One output unit message queue $46_o$ is shown accepting output messages from "other" DSS's on bus 22m.

In FIG. 2, there is seen one input unit queue 43, however, there may be multiple independent input unit queues 43, in addition.

As seen in FIG. 2, the input path may operate into a single Channel Adapter in Network Processor 50 having a single receiving unit $50_i$, which feeds input data into the Read input buffer 42, which is fed to the receiving unit queue 43 and then to multiple message queue $46_i$. When the buffer pools, $20_{ip}$, of Network Provider 20 issue the buffer Read command to the message queues 46i-16, then the unit 43 will transmit to the buffer pool $20_{ip}$, and thence to the image buffer pools and pointers $10_{ip}$ of the DSS 10.

The interfaces between the DSS 10 (or other DSS's), and the Network Provider 20 is basically indicated in FIG. 2. These can be designated as system software interfaces.

The purpose of these system software interfaces is to manage the initialization and termination of dialogs between the DSSs 10 and remote end points, and the flow of input and output data over these dialogs.

The functions of these system software interfaces involve (a) initialization and termination, (b) utilization of the input data path, and (c) utilization of the output data path. These are later described and amplified in discussion under Section B, hereinafter.

The Network Provider 20 is responsible for validating attributes from the DSS 10, and if no error is detected, the "Open Sequence" is initiated. The "Open Sequence" is a protocol-dependent exchange of messages which establishes a dialog. The Network Provider 20 notifies the DSS 10 when the "Open Sequence" has been completed, and when the remote side has initiated or completed termination. The Network Provider 20 must continue to handle both passive and active "opens", and the orderly and immediate "closes" (close abort). on the "Input" path interface of FIG. 2, the Network Provider 20 is responsible for passing received data to the DSS 10 and providing the DSS the opportunity to retain the data for subsequent retrieval. If the DSS retains the data, the DSS 10 is then considered to be the "owner" of that buffer, and is responsible for notifying the Network Provider 20 when the buffer is available for re-use.

On the "Output" data path interface, the Network Provider 20 is responsible for forwarding the buffer's data, passed to it by the DSS 10, over to the physical I/O 40, after attaching the appropriate headers. The Network Provider 20 is also responsible for notifying the DSS 10 when the buffer's data becomes available. Further, the Network Provider 20 is responsible for notifying the DSS 10 when outbound flow control is entered and is exited.

In regard to FIG. 2 in earlier implementations, a DSS would use the buffer pool $10_{op}$, and the DSS would indicate that it needs to send a message for service on another machine, so that the DSS would call the Network Provider 20. Then the Network Provider 20 would copy the data again, and the Network Provider 20 would now have his own copy of the data from the buffer pool $10_{op}$. Then the Network Provider 20 would send the data down to be copied by the Physical I/O 40 through the queue $46_o$, and the data would get copied into the memory of the Channel Adapter 50 (FIG. 2).

Now in the present system, the DSS 10 builds the data directly into the buffer pool 10op. However, since the system is now sharing the references to this buffer pool $10_{op}$, it is not necessary to copy it over to the Network Provider 20. What happens here is that the Network Provider 20 builds a header in header pool $20_{hp}$, which will be useful for sending or transmitting the data in $10_{op}$ to the DSS 10 or another machine. The Network Provider 20 uses the image pool $20_{op}$ of the buffer pool $10_{op}$ which involves a selection of pointers.

Under the earlier methodology, the User would have some data, and would call the DSS 10 to send the data to a buffer pool in the Network Provider 20, plus a header pool to describe what was going to happen to the data. Then the User would say he needs to send that information and would call the Network Provider 20, which would operate to say "I put my own header material on the front, and then behind this I have the messages from the DSS 10, and I will pass this down another level to the Physical I/O 40 to be sent to the Channel Adapter." Thus, what was done was to copy the User data into the DSS buffer, and then "again copy" the User data and the DSS data into the Network Provider buffer, (in the Network Provider 20). Then the entire message data and header package would be sent out to the I/O 40 and the Channel Adapter in 50.

Quite contrarily, under the presently described system, the real buffer $10_{op}$ of the DSS 10 is then placed as an image pointer in the Network Provider 20. This image is merely just a reference into the memory of the DSS 10.

So what is done is to copy the User's data into the DSS's buffer $10_{op}$, and still put the DSS's header on the front of it, but now, under the present system, it is not necessary to copy this data into the Network Provider 20. The image buffer pointer pool $20_{op}$ of the Network Provider 20 is not a copy of the data, but is merely a reference unit using pointers, which involves functions similar to that of a pointer looking into another person's memory. So a considerable savings is initiated since it is much faster, in that it is not necessary to "copy" the data, but merely to set up a reference pointer to a memory.

What is still utilized here, is the Network Provider's header pool $20_{hp}$, and then using the "Gather" operation where it is possible to concentrate and pass the two buffers ($10_{db}$ and $20_{hp}$) collectively, i.e. first one, and then the second, on just one request, so no data was necessary to be copied. So now the present operation copies the data out of the User's buffer, but is not required to copy the DSS's data, or copy the DSS's copy of the User's data.

This data still sits in a section of memory and it gets sent out on the wire, and when the "send" is finished, it tells the DSS 10 that the transmission was completed.

The data in memory remains in the DSS buffer pool $10_{op}$, so that there is the concept of "buffer sharing" which is operating in the outward path direction. Likewise, this is also done in the inward, or input path direction.

Thus, the module which owns the buffer, for example, the Network Provider owning the buffer pool $20_{ip}$, passes the reference pointers to $10_{ip}$ of the DSS 10 and it does not have to copy the data and pass it on.

So rather than copying, for example, on the input path channel, it is only necessary to get in the "message" which has three parts to it; (i) the Network Provider portion 20 on the front, then (ii) the DSS 10 part in the middle, and then (iii) the "User" part on the end. Thus, rather than copying (which formerly had to be done), it is just not necessary to copy this particular part into the buffer $20_{ip}$, which would then be copied into the User's Buffer by utilization of the image pointers or buffer pools $10_{ip}$. These pointers are a view pointing to the memory, so that the DSS 10 has a view of the memory that belongs to the Network Provider 20.

Then the Network Provider 20 sends the pointers which access the memory for transmission to the User buffer.

So what is actually being done is to tell the DSS 10 where the dialog information is located in the buffer, $20_{ip}$ of the Network Provider 20.

The Cooperative Service Interface 12 involves a series of line interactions. It involves the "projection" of the two buffer pools $10_{op}$ and $20_{ip}$ from one environment into the other, using a set of pointers which are in the interface, these image pointers being $20_{op}$ and $10_{ip}$.

It may be noted there is a similar set of image pointers for the lock pool $20_{Lp}$ which operates for coordination to make sure that two requesters are not trying to access the same memory location at the same time.

The Cooperative Service Interface 12 provides an additional performance over the earlier types of Sync_Ports by allowing a Network Provider 20 and a DSS 10 to bypass the Port File code in the Master Control Program (MCP), by allowing it to share data and by relaxing the rules about what can be performed as part of an input notification.

Figure 4:
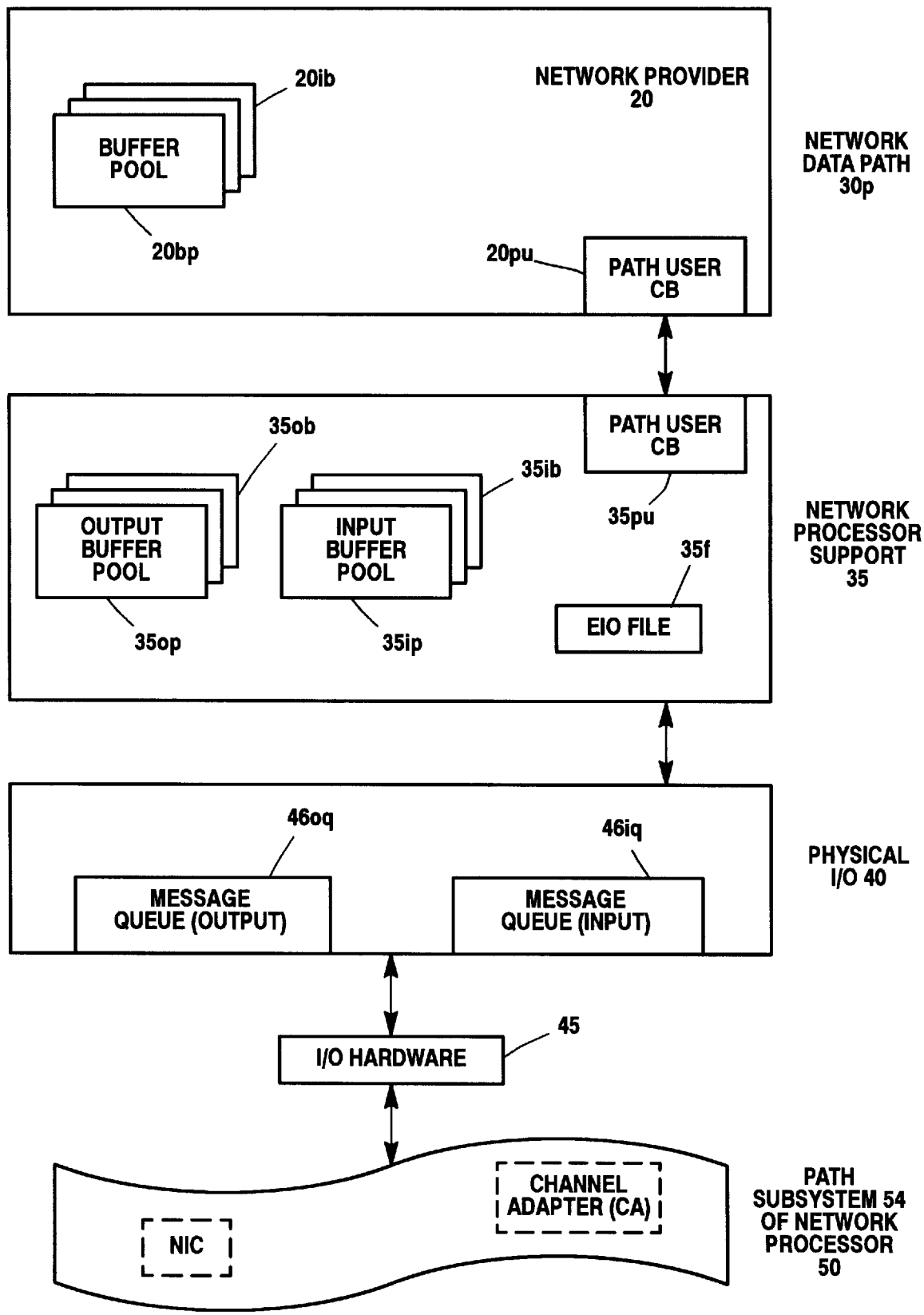
FIG. 4 is a drawing of an earlier Networking Data Path Interface architecture which involved Connection Blocks which were burdened with high overhead, undesired latencies and multiple lock pools.

The interface between the MCP's Port File code and the Network Providers was previously implemented as an old-style Connection Block (CB), such as seen in FIG. 4. By changing this implementation to a Connection Library (CL), as in FIG. 5, this provided a performance advantage by eliminating the MCP overhead required to access entry points exported via a Connection Library (CL). Because Connection Libraries can export data items in addition to procedures, this change also allows for Port File code and the Network Providers to "share" dialog-oriented locks. Such sharing allows elimination of the elaborate lock-deadlock avoidance code previously employed and is now permitted to be simplified greatly, thereby not only improving performance, but also closing numerous timing windows. Sharing locks this way also obviates the need for several of the more complex interfaces previously required.

The E-mode-based portions of Network Providers currently communicate with their ICP-based (Integrated Communication Processor) components via an interface provided by NP Support 35. The NP Support used to provide (FIGS. 3,4) a complex path CB (Connection Block) interface which Network Providers use to get the data they wish to send into a I/O capable buffer, and NP Support generates and parses the Queue Service Provider (QSP) protocol in order to multiplex the numerous dialogs the Network Providers have, over a single physical unit queue.

In the improved architecture, multiple queues are provided between the E-mode environment, and a given Channel Adapter environment, obviating the need for the earlier multiplexing function, and eliminating the de-multiplexing bottleneck on the NP/Controller stack on the input. Since the QSP protocol generation is very simple, that function has been moved into the Network Providers. This redistribution of function allows the NP Support 35 to be eliminated from the data path.

To avoid the necessity of copying data in order to assemble Network Provider-generated header data, and data from multiple-user buffers into one contiguous memory area, the ability to Gather data from multiple buffers on output is added to the I/O processor in the I/O 40. The physical I/O simulates Gather in cases where the I/O processor does not support it directly.

In addition, a Scatter feature is provided, so that a single incoming data message can be split across multiple buffers. This is used by the Network Providers 20 to ease their memory management problems; they have consolation code to cope with cases where Scatter is not provided by the I/O processor.

DATA AND STATE SHARING: The buffer pool $10op$ shown in FIG. 2 is the output buffer pool which is owned by the DSS 10, and is exported to the Network Provider 20 where its imported image is shown with the dashed lines as $20op$, which holds pointers.

Similarly, the same solid and dashed lines are used to show the "owners" and the imported images of other shared data items. The dialog lock pool $10_{Lp}$ is owned by the DSS 10, at $10ip$ for holding pointers and is exported to the Network Provider 20. Likewise in FIG. 2, the input buffer pool $20ip$, which is owned by the Network Provider 20, is exported to the DSS 10.

One output unit queue is shown accepting output messages from other DSS's on line $22m$. The diagram in FIG. 2 shows multiple input unit queues. In actual implementation, there can be multiple independent input unit queues, up to 16 for example.

The purpose of the Cooperative Service Interface 12 is to manage the initialization and termination of dialogs between DSS's and remote end points, and manage the flow of input and output data over those dialogs.

INITIALIZATION AND TERMINATION: The Network Provider 20 is responsible for validating attributes from the DSS 10, and if no error is detected, an "Open Sequence" is initiated. The Network Provider 20 notifies the DSS 10 when the Open Sequence has completed, and also when the remote side has initiated or completed termination. Network Providers must continue to handle both passive and active "opens", and orderly and immediate closes.

INPUT DATA PATH: On the input data path of FIG. 2, the Network Provider 20 is responsible for passing received data to the DSS 10 and providing the DSS the opportunity to "retain" the data for subsequent retrieval. If the DSS retains the data, the DSS 10 is then considered to the "owner" of that buffer, and is responsible for notifying the Network Provider when the buffer is available for re-use (de-allocation).

OUTPUT DATA PATH: On the output path of FIG. 2, the Network Provider 20 is responsible for forwarding the buffers passed to it by the DSS 10 over to the Physical I/O 40 after attaching the appropriate headers from the header pool $20hp$. The Network Provider 20 is also responsible for notifying the DSS 10 when buffers become available. Additionally, the Network Provider 20 is responsible for notifying the DSS 10 when outbound flow control is entered and exited.

ARCHITECTURE: In order to provide additional performance requirements, the Cooperative Service Interface 12 will make use of the Connection Library mechanism, shown in FIGS. 2 and 5. Linkage is initiated by the DSS 10. This interface will not be operative before a Network Provider 20 has been established with Network Processor Support 35, and may be terminated unexpectedly if the Network Processor Support changes versions while the Network Provider 20 is running. A single Connection Library may support multiple dialogs. Thus the DSS 10 has a Connection Library 10c and the Network Provider 20 has a Connection Library 20c.

DSS CONNECTION LIBRARY DATA ITEMS: These data items are exported by the DSS Connection Library (CL) 10c, FIG. 5, and imported by Network Provider Connection Library (CL) $20_c$, FIG. 5.

The buffer pool 10op in FIG. 2 is used for DSS-initiated outbound data requests. A reference to the same buffer may be passed on to the Network Provider 20 for more than one dialog at a time. It may also be passed to more than one Network Provider at a time. As such, the Network Provider 20 may not write into the buffer. If this kind of sharing across dialogs and Network Providers is done, the DSS 10 must ensure that the "same lock" is used for all dialogs to which the buffer reference may be passed. This for example, in FIG. 2, could be a lock such as item $10_{dL}$.

In FIG. 2, the shared lock pool is designated $10_{LP}$ and is used for guarding the "state" related to dialogs implemented over this instance of the Cooperative Service Interface 12. When calling imported Network Provider procedures, the DSS will be "holding" the shared dialog lock. The Network Provider 20 may not release the lock before returning from the call. When the Network Provider 20 calls one of the exported DSS procedures, it must do so while holding the dialog lock. The DSS 10 may not release the lock before returning from the call.

To avoid deadlocks, both the DSS 10 and the Network Provider 20 must enforce consistent lock-ordering rules regarding locks which are held at the same time as the dialog lock, in addition, if either entity needs to hold two or more dialog locks simultaneously, it must grab the one with the lowest lock number first.

NETWORK PROVIDER CONNECTION LIBRARY DATA ITEMS: In FIG. 5, these are the data items which are exported by the Network Provider Connection Library $20_c$, and which are imported by the DSS Connection Library $10_c$.

In FIG. 2, the buffer pool 20ip is the buffer pool which contains inbound requests. The DSS 10 may not Write into the Network Provider's buffer pool 20ip.

INITIALIZATION, TERMINATION, OTHER ADMINISTRATION INTERFACE ITEMS: The Connection Library $10_c$ of FIG. 5 between the Network Provider 20 and the DSS 10 provides support for dialog initiation and for termination for the DSS 10. It also provides a mechanism whereby the DSS 10 and the Network Provider 20 can exchange information global to all dialogs associated with this connection library, such as the IDs of the buffer pools that will be used for input and output.

There is no automatic mechanism for returning buffers to their declarers. This must be done by the DSS 10 and the Network Provider 20. It is the responsibility of the DSS 10 to return all Network Provider buffers retained by the DSS. Similarly, it is the responsibility of the Network Provider 20 to return all DSS buffers passed to the Network Provider for transmission over the network. Buffers are to be returned as soon as convenient, but there is no requirement that buffers be returned before the dialog (that they are associated with), terminates.

MAIN FUNCTIONS

INPUT PATH FOR NETWORK DATA PATH INTERFACE 30:

The following functions are provided in the interfaces on the "Input Data Path (FIG. 3B)":
(f1) CA/ICP 50 to Network Processor Support 35: (Channel Adapter/Integrated Communications Processor-Network Provider Support).
  (a) Support of multiple pipes.
  (b) Simulation of multiple pipes on systems which do not support multiple pipes.
(f2) Network Provider 20 to Physical I/O 40:
  (a) Network Provider waits for input from Physical I/O.
(f3) Network Processor Support 35 to Network Provider 20:
  (a) Initializes and terminates input pipes/queues.
  (b) Network Provider manages input buffer pools.
  (c) Network Provider initializes buffers via Network Processor Support.

OUTPUT DATA PATH FUNCTIONALITY FOR NETWORK DATA PATH 30:
(01) Network Processor Support 35 to CA/ICP, 50:
  (a) Support of Gather.
  (b) Simulation of Gather on systems which do not support Gather.
(02) Network Provider 20 to Network Processor Support, 35:
  (a) Network Provider initiates output request to Physical I/O.
  (b) Physical I/O returns exception result to the Network Provider.

Now referring to FIG. 4, there is shown a diagram of the prior earlier-used Network Data Path implementation with Connection Blocks. These interfaces required considerable extra overhead and undesirable latencies in operations.

In order to subsequently emphasize the substantial improvements in the newly developed Network Datapath Interface, there will first be discussed the sequential operations of the less efficient Connection Block interface in a section designated Section AA which will be contrasted, in a later Section BB, which delineates the improved Network Data Path Interface.

The prior architecture of FIG. 4 shows the Network Data Path Interface 30p having a Network Provider with a buffer pool 20bp which utilizes a selected buffer 20ib for a particular dialog message. This message can be input or output via the Path User Connection Block (CB) 20pu, which communicates with the Connection Block 35pu of the Network Processor Support 35.

The Network Processor Support 35 provides an output buffer pool 35op which has a selected buffer 35ob for a particular dialog message. The input buffer pool 35ip utilizes a selected buffer 35ib for particular input dialog message data. A file 35f designated as EIO file communicates with the I/O 40 having an Output Message Queue 46oq and Input Message Queue 46iq.

I/O Hardware 45 transports data between I/O 40 and the Path Subsystem of Network Processor Environment 50 which can include ICPs (Integrated Communications Processors), Channel Adapters or other peripheral modules as seen in FIG. 3B where the Network Processor 50 shows the ICP environment.

The following Section AA will illustrate the prior functions of the Network Data Path Interface:

SECTION AA

PRIOR NDP INTERFACE OPERATIONS

Prior Network Data Path (Path CB Interface). Functions (FIG. 4):

AA1. Sending Data—Initiation (starting the data flowing out to the CA (Channel Adapters).

AA2. Sending Data—Completion (notification that the data has been sent and the buffer can be reused).

AA3. Receiving Data—Initiation (providing a buffer to be filled with [input] data at some point in the future).

AA4. Receiving Data—Completion (notification that the buffer has now been filled with input data).

AA5. Delayed Processing of Input Data.

AA1: Sending Data—Initiation

Detailed Operations of Steps AA1–AA5 are shown below.

1. Network Provider 20 calls Network Processor Support 35 via Path user CB 20*pu*.

2. Network Processor Support 35 allocates an output buffer 35*ob* from output buffer pool 35*op*.

3. Network Processor Support calls the Network Provider 20 back via a formal procedural parameter.

4. Network Provider 20 copies the data from its buffer 20*ib* (a member of buffer pool 20*bp*) into Network Processor Support's buffer 35*ob*.

5. Network Provider returns to Network Processor Support.

6. Network Processor Support 35 builds QSP protocol around Network Provider's data in buffer 35*ob*.

7. Network Processor Support 35 calls Physical I/O 40 by issuing a WRITE on the EIO File object 35*f* which references the buffer 35*ob*.

8. Physical I/O 40 queues the data to the Channel Adapter via the output queue 46*oq*.

9. Physical I/O returns to Network Processor Support 35.

10. Network Processor Support returns to the Network Provider 20.

11. Network Provider 20 may now reuse its buffer 20*ib*.

AA2: Sending Data—Completion

1. Network Processor Support 35 receives a signal from Physical I/O 40 that the Channel Adapter has accepted the data from buffer 35*op*.

2. Network Processor Support 35 may now reuse its buffer 35*ob*.

3. Network Processor Support 35 returns buffer 35*ob* to buffer pool 35*op*.

AA3: Receiving Data—Initiation

1. Network Processor Support 35 allocates a buffer 35ib from input buffer pool 35*ip*.

2. Network Processor Support makes the buffer 35*ib* available for input by calling Physical I/O 40 via a READ on the EIO File object 35*f*.

AA4: Receiving Data—Completion

1. Network Processor Support 35 is signaled that a previously issued READ on input buffer 35*ib* has completed (the Channel Adapter has filled it with data).

2. Network Processor Support 35 parses the QSP header to determine which path user CB 35*pu* should receive the data.

3. Network Processor Support 35 calls Input_Delivery in the Network Provider 20 via the Path User CB 35*pu*.

4. The Network Provider 20 then processes the data.

5. Network Provider 20 returns to Network Processor Support 35, and tells it whether the buffer 35*ib* can be reused.

6. IF buffer 35*ib* can be reused, Network Processor Support returns it to the input buffer pool 35*ip*.

AA5: Delayed Processing of Input Data

1. Network Provider 20 calls Retrieve_Data in Network Processor Support 35 via the path CB 20*pu*.

2. Network Processor Support 35 determines that the Network Provider 20 wants buffer 35*ib*.

3. Network Processor Support 35 calls the Network Provider back via a formal procedural parameter.

4. Network Provider 20 processes the data.

5. Network Provider 20 returns, telling Network Processor Support 35 whether the buffer 35*ib* can be reused.

6. If the buffer 35*ib* can be reused, Network Processor Support returns it to the input buffer pool 35*ip*.

SECTION BB

IMPROVED NETWORK DATA PATH INTERFACE

Improved Network Data Path Functions: (FIG. 2)

BB1. Sending Data—Initiation (starting the data flowing out to the CA (Channel Adapter).

BB2. Sending Data—Completion (notification that the data has been sent and the buffer can be reused).

BB3. Receiving Data—Initiation (providing a buffer to be filled with input data at some point in the future).

BB4. Receiving Data—Completion (notification that the buffer has now been filled with [input] data).

BB5. Delayed Processing of Data (Network Provider processing the data later).

Reference to FIG. 2 for detail on the new implementation, is now made for contrast to the prior implementation of FIG. 4 (as was described in Section AA).

BB1: Sending Data Out—Initiation

1. Network Provider 20 builds QSP protocol as part of its header data.

2. Network Provider calls Start_ICP_IO in Physical I/O 40 passing its header buffer 20*hb* (FIG. 2) and the DSS's buffer 10*db*.

3. Physical I/O queues the data to the Channel Adapter via the Output Queue 46*o*.

4. Physical I/O 40 returns to the Network Provider 20.

5. Network Provider 20 may not reuse its buffer 20*hb* and DSS 10 may not reuse its buffer 10*op* until notified that the I/O is complete.

BB2: Sending Data—Completion

1. Network Provider 20 receives a signal from Physical I/O 40 that the Channel Adapter in NIC 50 has accepted the data.

2. Header buffer 20*hb* and output buffer 10*db* may now be reused.

BB3: Receiving Data—Initiation

1. Network Provider 20 allocates a buffer 20*ib* from buffer pool 20*ip*.

2. Network Provider makes the buffer available for input from its statically defined queue 46$_i$ by calling Start_ICP_IO_In in Physical I/O 40 via the Data_Path_CL.

BB4: Receiving Data—Completion

1. Network Provider 20 is signaled that a previously issued input request on input buffer 20*ib* has completed.

2. Because the statically defined queue was used, there is no need to route the incoming data. It is already known that it belongs to this Network Provider.

3. The Network Provider then processes the data.

4. Network Provider decides whether the input buffer 20*ib* can be reused. If it can, Network Provider 20 returns buffer 20*ib* to input buffer pool 20*ip*.

BB5: Delayed Processing of Data

1. Network Provider 20 merely references the data in its buffer, 20*ib*.

2. Network Provider decides whether the input buffer 20*ib* can be reused. If it can, Network Provider returns buffer 20*ib* to input buffer pool 20*ip*.

Thus, it can now be seen that the functional sequences for the improved Network Data Path Interface are much reduced, thus eliminating considerable overhead plus speeding and simplifying the data transfer cycles while reducing the latency period of the prior type of interface, especially since the elimination of the Network Processor Support unit 35 is accomplished and no longer needed.

Described herein has been an improved network data path method and system whereby there have been provided considerable improvements to network-related software and particular improvements between the portion of the protocol stack implementations which run on the main processor, and the portions of the data handling implementations which run on Network Interface Cards (NIC).

What has been accomplished is that buffer management responsibility has been moved from the interface software (NP Support 35) to the protocol stack itself (NP 20), and whereby slower prior types of Connection Block (CB) interfaces have been replaced with Connection Library (CL) interfaces. Additionally, the I/O subsystem 40 has been reconfigured to support multiple units/pipes per given Network Processor/Channel Adapter, while the functionality of Scatter/Gather operations are supported during data transmission between environments.

As a result of the improved software functions, the protocol stacks are provided with more knowledge of the actual usage of buffers and thus can manage them more efficiently, which includes a reduction in the need for data copying. Further, the method and system allows more transmissions to occur simultaneously, reduces the routing overhead at the destination, and increases multi-threading.

A preferred implementation of the improved network data path functionality has been described herein, but it should be understood that the invention is to be considered as defined in the attached claims.

What is claimed is:

1. In a Network Data Path Interface function of a high speed data communications system, a method for enhancing speed of output data transfers between a Network Provider 20 (NP), associated with a Distributed System Service unit 10, (DSS) and a Channel Adapter (CA) in a Network Interface Card 50 (NIC) via an I/O Module 40 (IOM), said method including the steps of:

(a) initializing, by said Network Provider 20, a sending-data operation from said DSS 10 to said Channel Adapter (CA) wherein said DSS(10) supplies control and ownership of a buffer pool (10*op*) and a lock pool (10L*p*) and wherein said Network Provider (20) holds an image pointer virtual buffer pool (20*op*) and a virtual image lock Tool (20L*p*) controlled by said DSS(10);

(b) enabling, via a Connection Library (10*c*–20*c*) the exportation of memory addresses and the sharing of buffers and locks between said DSS(10) and said Network Provider (20)(NP);

(c) completing the transfer of data to said Channel Adapter (CA) by said IOM Module (40) sending a completion signal to said Network Provider 20 indicating that the Channel Adapter (CA) has accepted the data.

2. The method of claim 1 wherein step (a) includes the steps of:

(a1) building, by said Network Provider 20, of a Queue Service Protocol as part of its header data; and locking a chosen DSS-output buffer (10*db*) and said Network Provider's chosen header buffer (20*hb*);

(a2) calling, by said Network Provider 20, of a start-I/O operation in said IOM 40 causing the concatenation of said Network Provider's header buffer (20*hb*) with the DSS's chosen output data buffer (10*db*) for transfer of output data to an Output Queue 46*o*).

3. The method of claim 2 wherein step (a) further includes the steps of:

(a3) transferring said output data to said Channel Adapter (CA);

(a4) returning control, by said IOM (40) to said Network Provider (20).

4. The method of claim 3 wherein step (a) further includes:

(a5) unlocking said Network Provider buffer (20*hb*) and said DBS buffer (10*db*) only after the output data transfer has been completed.

5. The method of claim 1 wherein step (c) includes the step of:

(c1) releasing said Network Provider's header buffer (20*hb*) and said DSS's output buffer (10*db*) for use in storing and transferring newly provided output data.

6. In a Network Data Path Interface function of a high speed data communications system, a method of enhancing speed of input data transfers from a Channel Adapter (CA), holding multiple in-put queues, said Channel Adapter operating in a Network Interface Card (50) (NIC), via an Input/Output Module (40) (IOM) to a Network Provider (20) (NP), associated with a Distributed System Service unit (DSS 10), said method including the steps of:

(a) allocating by said Network Provider (20) of said Network Provider's selected input buffer (20*ib*) from its input buffer pool (20*ip*);

(b) calling, by said Network Provider 20, of a start operation in said IOM 40, to initiate transfer of input data from a selected queue of said IOM's multiple input message queues (46*i*), over to said Network Provider's selected input buffer (20*ib*) and establishing a dialog ID for the transfer operation;

(c) controlling and maintaining ownership, by said Network Processor (NP20) of an input buffer pool (20*ip*) and a virtual image lock pool (20L*p*), and a lock pool (10L*p*) and virtual image buffer pool (10*ip*) within said DSS(10).

(d) completing transfer of said input data from said input message queue (46*i*) to said Network Provider's chosen input buffer (20*ib*).

7. The method of claim 6 wherein step (a) includes the step of:

(a1) locking said selected input buffer (20*ib*) from access to any other input transaction than the properly identified dialog ID.

8. The method of claim 7 wherein step (b) includes the step of:

(b1) utilizing a Connection Library (CL) means for input data transfers from said selected input message queue (46*i*) to said Network Provider's selected input buffer (20*ib*) said Connection Library means for exporting memory addresses and enabling sharing of buffers and lock pools.

9. The method of claim 8 wherein step (b) further includes the step of:
   (b2) signaling, by said IOM (40), to said Network Provider (20), that said input data in said selected input message queue (46*i*) has been completely transferred.

10. The method of claim 9 wherein step (b) includes the step of:
    (b3) processing said received input data in said input buffer (20*ib*);
    (b4) enabling said DSS(10) to acquire said input data.

11. The method of claim 10 wherein step (b) includes the step of:
    (b5) unlocking the said buffer (20*ib*) and releasing it back to said input buffer pool (20*ip*).

12. A system for transferring data messages into and out of a data communication network comprising:
    (a) A DSS application unit (10) for initiating the sending out of message data from a selected buffer (10*db*) in a buffer pool (10*op*) and including:
       (a1) locking means (10Lp) for locking a specified dialog from interferences of other dialogs;
       (a2) virtual image output buffer pool means (20*op*) for replicating via address pointers in a Network Provider (NP20), the message data residing in said buffer pool (10*op*);
       (a3) means for transferring said message data without re-copying the data at said (NP20);
       (a4) a virtual image input buffer pool (10*ip*) utilizing memory address pointers to provide input message data for said DSS(10);
    (b) Connection Library means enabling the export of addresses and the sharing of buffers and lock pools between said DSS(10) and said NP(20);
    (c) said Network Provider (NP20) providing said virtual image Output buffer pool means (20*op*), a header pool (20*hp*), a virtual image lock pool (20Lp), and an Input buffer pool (20*ip*) and operating to enable message transfer from said DSS(10) to a Channel Adapter (CA) via said NP(20) and including:
       (c1) means to also enable input data message transfer from said Channel Adapter (CA) in a Network Interface Card (50) to said DSS(10) via said (NP20) by locking-up a particular dialog and transferring message data from said Input buffer pool (20*ip*) to said DSS(10) without need to recopy the message data from said input buffer pool (20*ip*) to said DSS(10);
    (d) on I/O Module (40) providing multiple Input queues for input data and a single Output queue for output data, connected said I/O module to a Network Interface Card (50) holding said Channel Adapter (CA).

13. A data communications network comprising:
    (a) DSS means (10) including:
       (a1) a DSS buffer pool (10*op*) with message data destined as Output to a channel adapter;
       (a2) a lock pool (10Lp) for locking a selected buffer (10*db*) for message data transfer;
       (a3) a virtual image buffer pool (10*ip*) for selecting a data message (20*ib*) which was input to an input buffer (20*ip*) of a network provider (NP) means (20);
    (b) said Network Provider (NP) means including:
       (b1) an NP virtual image buffer pool (20*op*) having memory pointers correlated to said DSS Output buffer pool (10*op*);
       (b2) an NP header pool for adding headers to data messages destined out for said Channel Adapter (CA);
       (b3) an NP virtual image lock pool (20Lp) correlated to said DSS lock pool (10Lp) for locking a specific dialog interchange;
       (b4) an Input NP buffer pool for receiving input data messages from a network processor (50);
    (c) Connection Library means for interfacing said DSS (10) and NP(20); and for memory address interchange;
    (d) I/O means (40) including:
       (d1) an Output message queue (46*o*) for holding an Output data message;
       (d2) a buffer-header unit (48) for holding an Output data message (48*h*) for transmittal to said Network Processor (50);
       (d3) an Input Read request unit (42) for conveying multiple Input data messages to a multiple message queue (46*i*-16) and enabling transfer of an Input data message to said NP buffer pool (20*ip*);
    (e) Network Processor means (50) including:
       (e1) means for receiving message data from said I/O (40) for said Channel Adapter (CA);
       (e2) means for inputting data messages to said I/O (40).

* * * * *